United States Patent [15] 3,636,319
Nixon [45] Jan. 18, 1972

[54] CIRCUIT FOR DISPLAYING DATA KEYED INTO DATA SYSTEM

[72] Inventor: Earl H. Nixon, Greensboro, N.C.

[73] Assignee: Western Electric Company, Incorporated, New York, N.Y.

[22] Filed: Feb. 19, 1970

[21] Appl. No.: 12,665

[52] U.S. Cl. ....................235/92 EA, 235/92 R, 235/92 ST, 235/92 SH, 235/92 CV, 340/347 DD

[51] Int. Cl. ....................H03k 21/22

[58] Field of Search ...........235/92 SH, 92 NC, 92 BQ, 92 M, 235/92 EA, 92 ST; 340/154, 347 DD; 307/221

[56] References Cited

UNITED STATES PATENTS

| | | | |
|---|---|---|---|
| 3,340,524 | 9/1967 | Rinaldi | 340/347 DD |
| 3,571,577 | 3/1971 | Kubo | 235/92 SH |
| 3,387,269 | 6/1968 | Hernan | 340/154 |
| 3,249,766 | 5/1966 | Bourget | 307/221 |
| 3,372,265 | 3/1968 | Gordon | 235/92 BQ |
| 3,304,416 | 2/1967 | Wolf | 235/92 AC |

*Primary Examiner*—Maynard R. Wilbur
*Assistant Examiner*—Robert F. Gnuse
*Attorney*—W. M. Kain, R. P. Miller and B. I. Levine

[57] ABSTRACT

Data from a keyboard entered into a data system is displayed on decimal output units. A counter stepped by each digit entered operates a plurality of gates to direct the data to a particular register which operates a display unit in accordance with the significance of the order of the digit. In an alternative embodiment, each digit is entered into an end display unit and then successively shifted across the display units as the next digit is entered.

2 Claims, 4 Drawing Figures

FIG-2

INVENTOR
E. H. NIXON
By D. W. Marks
ATTORNEY

CIRCUIT FOR DISPLAYING DATA KEYED INTO DATA SYSTEM

BACKGROUND OF THE INVENTION

1. Field of the Invention

In data systems, a keyboard or similar device is utilized to enter numerical data into the system by an operator. It is desirable that the numerical data being entered be displayed on a suitable display unit so that the operator may verify the correctness of the entered data.

2. Prior Art

There are a variety of display systems described in the prior art. They are characterized in that the systems utilized are not adapted for modern data systems, unduly complex or subject to malfunction.

SUMMARY OF THE INVENTION

An object of the invention is a new and improved circuit for displaying information entered manually by a keyboard into a data system.

In accordance with this and other objects, there is provided a circuit for simultaneously displaying a plurality of digits produced sequentially by a keyboard. Each digit entered operates an OR gate and a one-shot or monostable multivibrator to step counting facilities. The counting facilities operate AND gates in series with the inputs of a plurality of registers to sequentially enter the digits from the keyboard into successive registers. The data in the registers is displayed on corresponding display devices. Once all the display devices are full, entering an additional digit resets the counter, erases the prior digits stored in the registers and places the new digit in the highest order register.

In an alternative embodiment, each digit is entered into an end display device and then successively shifted to the next display device as each new digit is entered.

BRIEF DESCRIPTION OF THE DRAWINGS

FIGS. 1 and 2 may be placed side by side to show the complete circuit;

DETAILED DESCRIPTION

Figure 1:
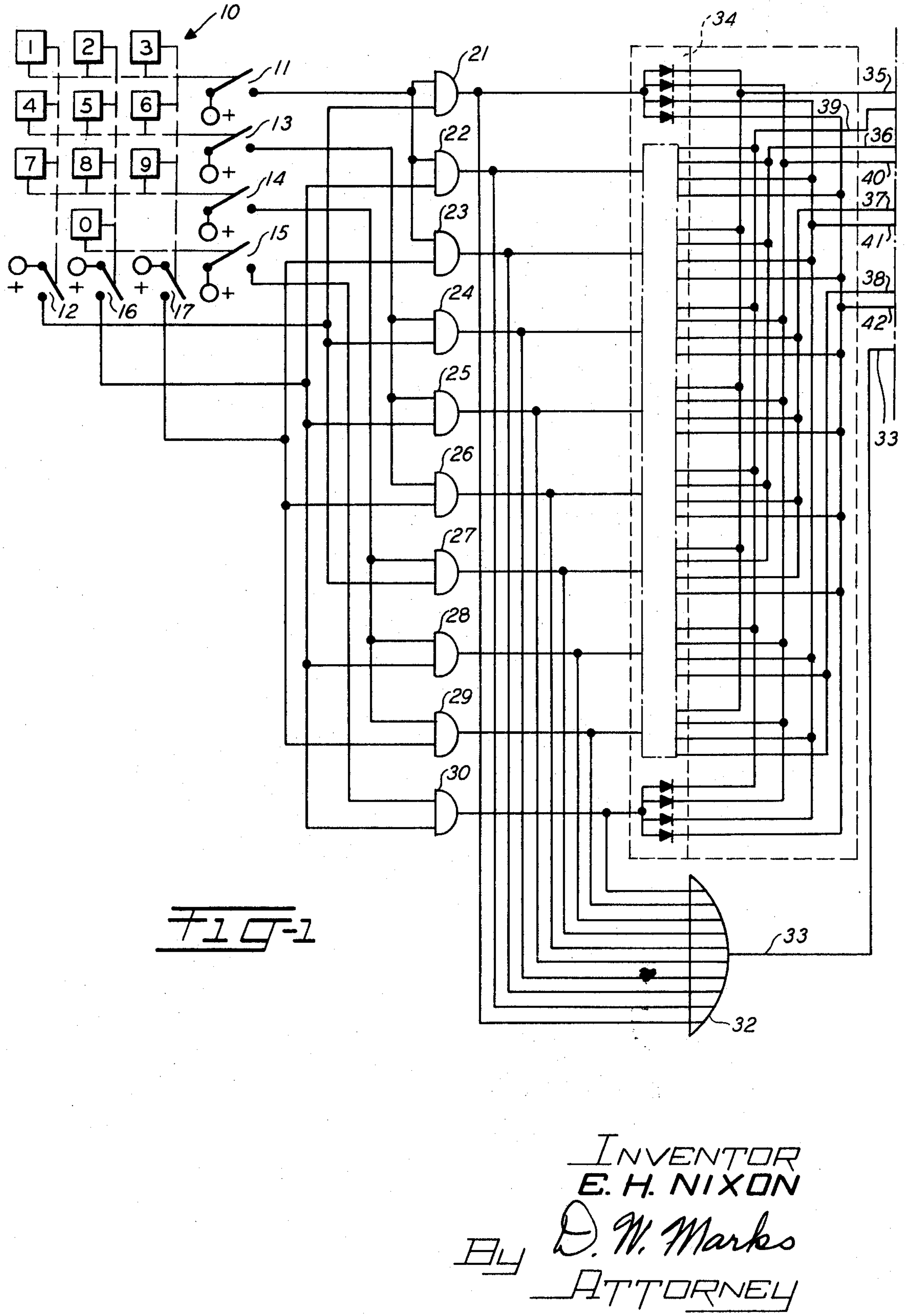
FIGS. 1 and 2 are circuit diagrams of an embodiment of the invention with FIG. 1 being the left side of the circuit and FIG. 2 being the right side of the circuit.

Referring first to FIG. 1, there is shown a manual keyboard 10. There are many types of manual keyboards which are suitable for entering data into a data system, but for simplicity there is described here a keyboard similar to the pushbutton keyboard utilized by many telephone companies. For example, there may be 10 keys which correspond to the numerical decimal digits 0–9. Pressing key 1 operates a switch 11 associated with a first row of the keys and a switch 12 associated with a first column of the keys. Switches 13, 14 and 15 are associated with second, third and fourth rows of the keys, while switches 16 and 17 are associated with second and third columns of the keys.

Throughout the description, there are described various logic units such as AND gate, OR gate, flip-flop, one-shot, delay one-shot and inverter. All are described in terms of positive logic where a high or positive level voltage represents a "1" and a low or zero level voltage represents a "0." An AND gate produces an output of "1" only when a "1" is present on all inputs thereto and the output is "0" for any other combination of inputs. An OR gate produces an output of "1" when there is a "1" present on any input. Only when no input of "1" is present is there an output of "0." A flip-flop refers to a bistable multivibrator or similar circuit or device having two stable states. The flip-flop may have a plurality of inputs for switching from one state to the other state with the application of a "1" thereto. Additionally, the flip-flop has two outputs, a "1" output producing a "0" output voltage level and a "0" output producing a "1" output voltage level when the flip-flop is in a first state; the output voltage levels are reversed when the flip-flop is in its second state. A one-shot refers to a monostable multivibrator or similar circuit or device which upon the application of "1" to the input thereof, the input going from "0" to "1," produces a single output pulse of "1" level having a selected duration. A delay one-shot refers to a air of cascaded monostable multivibrators or an equivalent circuit or device connected so that an output pulse of "1" level and selected duration is produced a predetermined duration of delay after a "1" is applied to an input thereof. An inverter refers to a device which produces a "0" output when a "1" is applied to its input and produces a "1" output when a "0" is applied to its input.

While the herein-described embodiment utilizes positive logic and several defined logic units, negative logic and other commonly used logic units may be readily employed to perform the same or equivalent functions.

A plurality of AND-gates 21–30 are connected to the switches 11–17 to sense which key was pressed. For example, the AND-gate 21 has inputs connected to switches 11 and 12 to produce an output of "1" to indicate that key 1 was pressed. Similarly, the AND-gate 22–30 have inputs connected to various pairs of the switches 11–17 to produce "1" outputs indicating a respective key 2–0 is pressed.

Some keyboards, such as are available under the trademark TOUCH-TONE of American Telephone and Telegraph Company, produce a tone having frequencies dependent upon the key pressed. With such keyboards, the AND-gates 21–30 could be replaced with a filter and logic unit having one input and ten outputs. The filter and logic unit senses the frequency characteristics of the tone and produces an output signal indicating which key was pressed. Such filter and logic units are commercially available or may be readily copied from publications.

The outputs of the AND-gates 21–30 are connected to an OR-gate 32 to produce an output of "1" on a line 33 when any key is pressed. In addition, the outputs of the AND-gates 21–30 are connected to a diode matrix 34 which converts the decimal data into binary coded decimal digits on output lines 35–38. The output lines 39–42 of the diode matrix 34 have signals representing the inverse of the signals on the respective lines 35–38.

Figure 2:
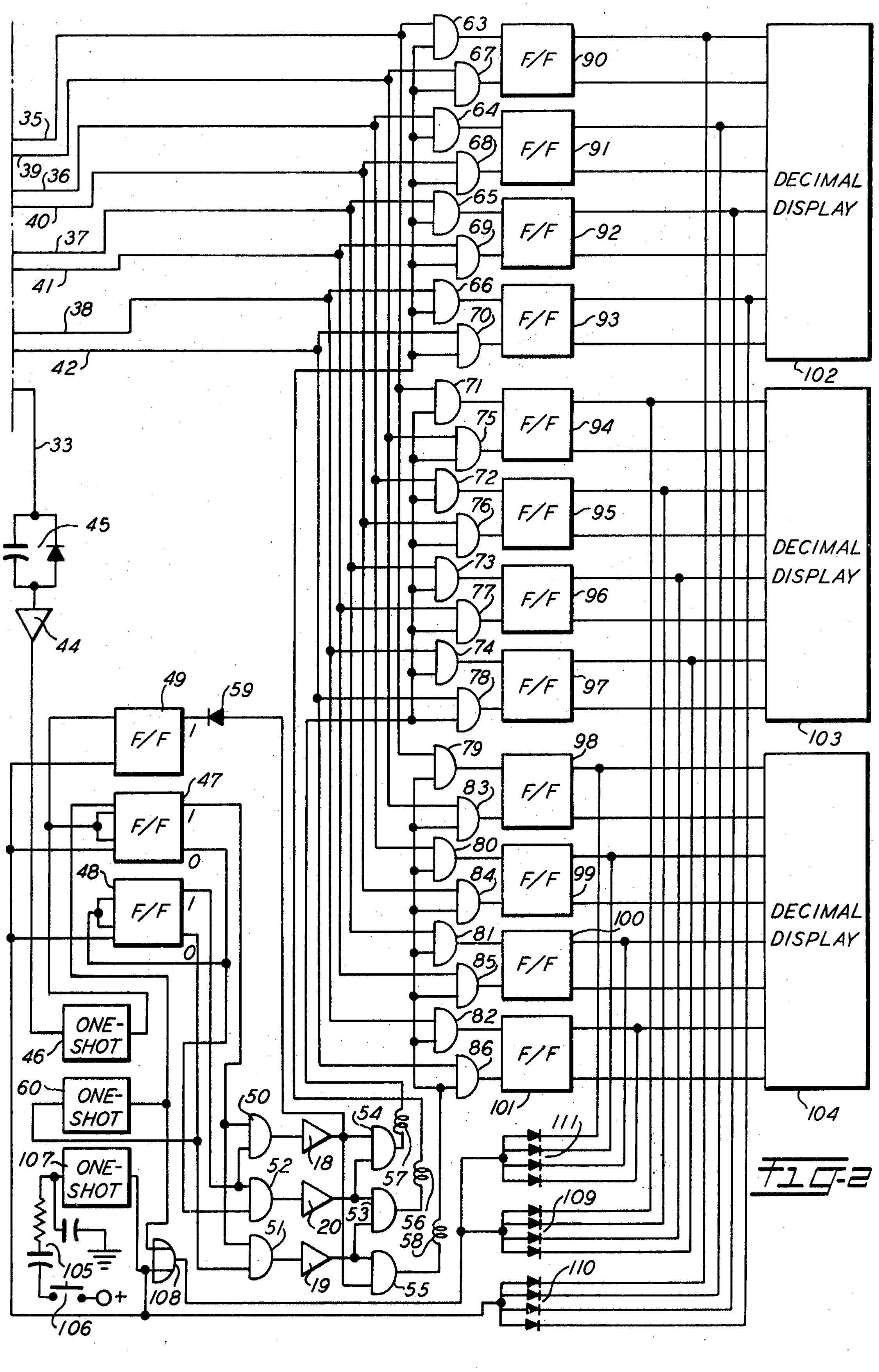

Referring now to FIG. 2, there is shown a second half of the circuit connected by lines 33, 35–42 to the circuitry shown in FIG. 1. Each signal produced on line 33 by depressing a key is applied by a filtering capacitor and diode network 45 and an inverter 44 to the input of a one-shot 46. The filtering capacitor and diode network 45 eliminate discontinuities, such as those produced by bouncing contacts, in the signal on line 33. Since the output of the OR-gate 32 is inverted by the inverter 44, the one-shot 46 produces an output pulse each time a key in the keyboard 10 is released. The output of the one-shot 46 is applied to an alternately steered input of a flip-flop 47 which is interconnected to a flip-flop 48 in a binary-counting arrangement. Each pulse from the one-shot 46 changes the state of the flip-flop 47 and when the 0 output of the flip-flop 47 changes from "0" voltage to "1" voltage, the flip-flop 48 changes states to indicate a different count.

Initially, the states of the flip-flops 47 and 48 are set by a pushbutton switch 106 in or adjacent to the keyboard 10. The switch 106 is connected to a one-shot 107 by a discontinuity filtering and elimination circuit 105. The switch 106 triggers the one-shot 107 which applies a pulse to inputs of both flip-flops 47 and 48 such that their 1 outputs produce "0" voltage levels.

Additionally, a flip-flop 49 is operated by the one-shots 46 and 107. The output of the one-shot 107 sets up the flip-flop 49 such that a "0" voltage is produced on the 1 output. After the flip-flop 49 has been set to this state, the first pulse from the one-shot 46 changes the state of the flip-flop 49 so that a "1" voltage is produced by the 1 output. Further, pulse from the onehot 46 are ineffective to change the state of the flip-flop 49 until it has been reset by the one-shot 107.

After being set by the one-shot 107 and before the first pulse from the one-shot 46, the 1 outputs of the respective flip-flops 47 and 48 are "0" and "0." Upon the next three pulses from one-shot 46, the 1 outputs of he flip-flops 47 and 48 sequentially produce "1," "0," "0," "1," and "1," "1" voltages, respectively. The four counts of the flip-flops 47 and 48 which are referred to as a counter are hereinafter referred to as "00," "10," "01," and "11."

A one-shot 60 has an input connected to the 0 output of the flip-flop 48 such that the one-shot 60 is triggered when the 0 output of the flip-flop 48 goes from a "0" voltage to "1" voltage or the counter goes from "11," to "00." The output of the one-shot 60 is applied to an input of the flip-flop 47 to set the flip-flop in the state where the 1 output is at the "1" voltage level. Thus upon the fourth pulse from the one-shot 46, the counter skips the count "00," and resets at the count "10." The count "00," only occurs upon the operation of the one-shot 107. The one-shot 107 is selected to produce a substantially longer output pulse than the one-shot 60 so that the output of the one-shot 60 will be ineffective to advance the flip-flop 47 when the one-shot 107 sets the count to "00."

A plurality of AND-gates 63–86 connect the output lines 35–42 of the diode matrix 34 to inputs of a plurality of flip-flops 90–101. The first four flip-flops 90–93 comprise a register to operate a decimal digital display device 102. Similarly, the flip-flops 94–97 operate a decimal display device 103 and the flip-flops 98–101 operate a decimal display device 104. The decimal display devices exhibit a decimal 0–9 depending upon the binary-coded decimal input applied thereto. A suitable display device is available under the trademark NIXIE, miniature NIXIE tube decoder/driver, model no. BIP-9801-1 sold by Burroughs Corporation, Plainfield, N.J.

The output of an AND-gate 53 is connected to second inputs of AND-gates 63–70 to control the application of the signals on lines 35–42 to the flip-flops 90–93. When the AND-gate 53 produces a "1" voltage output, the AND-gates 63–70 are enabled to allow the signals on lines 35–42 to set the flip-flops 90–93 to states corresponding to the binary-coded decimal signal on the lines 35–42 to display that decimal on the unit 102. Similarly, an AND-gate 54 controls the AND-gates 71–78 and an AND-gate 55 controls the AND-gates 79–86 to control the decimals displayed on units 103 and 104. Inductors 56–58 are connected in series with the outputs of the AND-gates 53–55 to smooth out or slow down the rise time of the signals applied to the AND-gates 63–86 to prevent any possible damage to the logic units.

AND-gates 50–52 have inputs connnected to the 0 and 1 outputs of the flip-flops 47 and 48. The AND-gate 50 has inputs from the 1 outputs both flip-flops 47 and 48 to produce a "1" output when the count is "11." The AND-gate 51 produces a "1" output on count "10" and the AND-gate 52 produces a "1" output on count "01." An inverter 18 connects the output of the AND-gate 50 to an input of the AND-gate 54 and an input of the AND-gate 55. Similarly, an inverter 19 connects the output of the AND-gate 51 to inputs of the AND-gates 53 and 55 and an inverter 20 connects the output of the AND-gate 52 to inputs of the AND-gates 53 and 54. Additionally, a diode 59 connects the 1 output of the flip-flop 49 to the inputs of the AND-gates 54 and 55.

With the count of the flip-flops 47 and 48 at "00" and the flip-flop 49 having been set by the one-shot 107 to produce a "0" voltage on the 1 output, the AND-gate 53 produces a "1" voltage output and the AND-gates 54 and 55 are held at "0" output by the "0" input from flip-flop 49. At count "10" the AND-gate 54 produces a "1" output while the AND-gates 53 and 55 are held at "0" output by the "0" inputs from the AND-gate 51 and inverter 19. At count "01," the AND-gate 55 produces a "1" output and the AND-gates 53 and 54 are held at "0" outputs by "0" inputs from the AND-gate 52 and inverter 20. At count "11" the AND-gate 53 again produces a "1" output while the AND-gates 54 and 55 are held at "0" output by the AND-gate 50 and inverter 18. Subsequent stepping of the flip-flops 47 and 48 by pulses from the one-shot 46 repeats the counts "10," "01," "11," etc.

When the switch 106 is pressed to set the initial operating condition, the one-shot 107 produces an output pulse which is applied through diodes 110 to the flip-flops 90–93. This resets the flip-flops 90–93 so that the display 102 indicates the decimal 0. Also, the pulse from the one-shot 107 is applied by an OR-gate 108 to diodes 109 and 111 to reset the flip-flops 94–101 so that the displays 103 and 104 also indicate decimals 0's. Additionally, the one-shot 60 applies a pulse to the OR-gate 108 to reset the displays 103 and 104 to decimals 0's when the count goes from "11" to "10."

OPERATION

Initially, the operator depresses the pushbutton switch 106 (FIG. 2) to actuate the one-shot 107 and erase the information contained in the flip-flop 90–101 controlling the display devices 102–104 so that they indicate decimal 0's. Also, the flip-flops 47 and 48 are set at count "00" and the flip-flop 49 is set to produce a "0" voltage on its 1 output. The AND-gate 53 enables the AND-gates 63–70.

Next, the operator presses a selected key in the keyboard 10 (FIG. 1) to produce a binary-coded decimal signal on lines 35–42 which are applied by AND-gates 63–70 to the flip-flops 90–93 to display the selected decimal on the unit 102. Upon releasing the key, the one-shot 46 operates to change the state of the flip-flop 49 and advance the count of the flip-flops 47 and 48 to "10." The AND-gate 54 now enables the AND-gates 71–78.

The operator selects a second digit by pressing a key in the keyboard 10 and the selected digit is displayed in the unit 103. Upon release of the key the count is advanced to "01" and the AND-gate 55 enables the AND-gates 79–86. A third digit is similarly displayed in the unit 104 and the count advanced to "11" where the AND-gate 53 again enables the AND-gates 63–70. The operator must now check the three digits displayed with the digits desired to be entered into the data systems. If they are not the same, the operator may take appropriate steps to prevent them from entering the data system. If they are correct, the operator may continue to enter additional digits.

The fourth digit is entered into the flip-flop 90–93 and changes the digit displayed in unit 102 from its previous display to the new digit. Upon releasing the key, the count is set to "10" by one-shot 60. Also, the output of one-shot 60 resets flip-flops 94–101 so that the units 103 and 104 display decimal 0's.

After a group of digits has been fully completed, the operator takes appropriate steps to enter the data into the data system.

ALTERNATIVE EMBODIMENT

Figure 3:
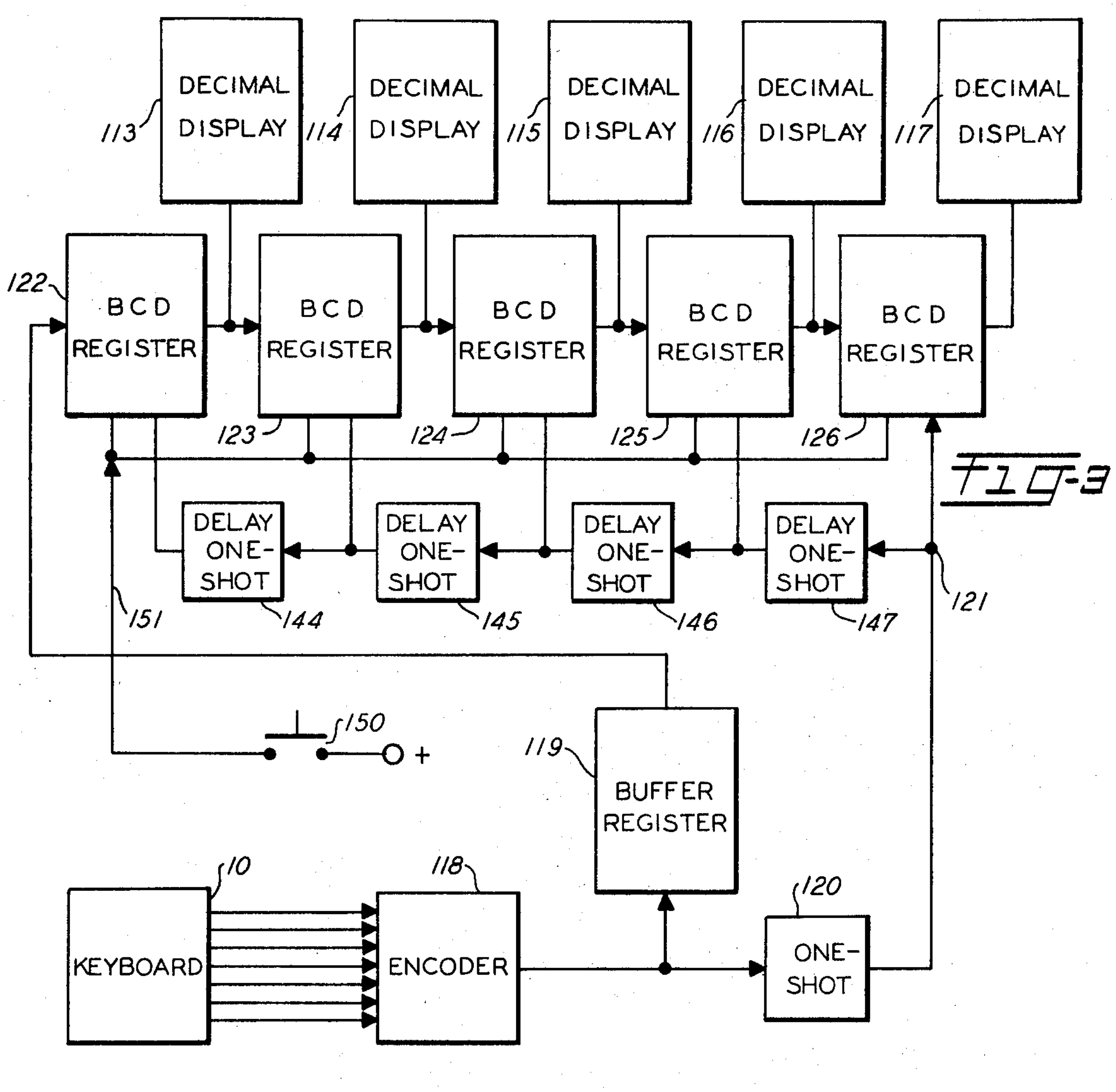
FIG. 3 is a circuit diagram of an alternative embodiment.

Referring to FIG. 3, there is shown an alternative embodiment for displaying the output of a keyboard 10 on a plurality of display devices 113–117. The display devices 113–117 are operated by the outputs of respective registers 122–126 in the same manner as the units 102–104 were operated by the flip-flops 90–101 of FIG. 2. The digit entered by the keyboard 10 is changed into binary-coded decimal form by an encoder 118 which is similar to the AND-gates 21–30 and diode matrix 34 of FIG. 1. THe output of the encoder is placed in a buffer register 119. A one-shot 120 is operated by the output of the encoder 118 upon each release of a key in the keyboard 10 in a manner similar to the operation of the one-shot 60 of FIG. 2. The output of the one-shot 120 is applied to the register 126 and a first delay one-shot 147 which is serially connected with delay one-shots 144–146 in a delay line configuration. The outputs of the delay one-shots 144–147 are connected to the respective registers 122–126.

Figure 4:
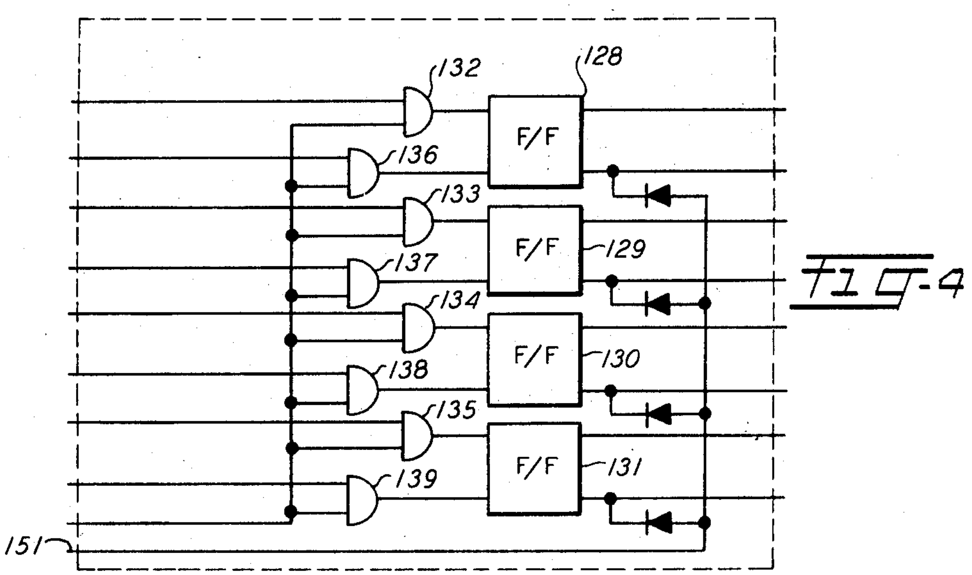
FIG. 4 is a circuit diagram of a binary-coded decimal storage register in the circuit shown in FIG. 3.

Referring to FIG. 4, each of the registers 122–126 has a plurality of flip-flops 128–131 with inputs connected to the outputs of AND-gates 132–139. FIrst inputs of the AND-gates 132–139 are connected to the outputs of the previous register. In the register 126, the second inputs of the AND-gates 132–139 are connected to line 121. In the registers 122–125, the second inputs of the AND-gates 132–139 are connected to the outputs of the respective delay one-shots 144–147. The signal on the line 121 or from the delay one-shots 144–147 is applied to the second inputs of he AND-gates 132–139 to store a new number in the flip-flops 128–131 to correspond to the number stored in the previous register with the output of the buffer register 119 connected to the input of the register 122. The signal on the line 121 and through the delay one-shots 144–147 is successively applied to the registers 122–126 from right to left as shown in FIG. 3, to cause the decimal digits keyed into the data system to move from the left display unit to the right display unit as shown in FIG. 3. A pushbutton switch 150 is provided to apply a signal on line 151 to each of the registers 122–126 to reset the flip-flops 128–131 so that the displays 113–117 indicate the decimal 0.

It is to be understood that the above-described embodiments are simply illustrative of the principles of the invention and that many embodiments may be devised without departing from the scope and spirit of the invention. For example, the embodiments described units for simultaneously displaying three and five decimal digits. Embodiments could easily be devised to display more or less digits.

What is claimed is:

1. A circuit for simultaneously displaying $n$ digits produced sequentially by a keyboard for numerical data system comprising:

OR gate means connected to the output of the keyboard for producing a first signal indicating the presence of a signal from the keyboard;

monostable multivibrator means connected to the output of the OR gate means for generating a single pulse at the end of each first signal produced by the OR gate means;

a binary-counting circuit having a plurality of bistable multivibrators connected to the output of the monostable multivibrator means for counting $n$ pulses; said counting circuit including automatic resetting means for resetting the counting circuit to the 1 count upon the receipt of the $n+1$ pulse;

$n$ display devices for displaying $n$ digits;

$n$ registers, each having a plurality of bistable multivibrators, one register associated with each display device, for operating the display devices, at least $n-1$ of the registers having clearing means connected to and operated by the automatic resetting means of the counting circuit for clearing the display devices; and $n$ AND gate means having inputs connected to the keyboard and the counting circuit and outputs connected to inputs of each respective register, each AND gate means operated by a separate count of the counting circuit for sequentially placing $n$ digits in the $n$ registers.

2. A circuit as defined in claim 1, wherein the automatic resetting means includes a first one-shot connected to the counting circuit for operating at the initiation of the $n+1$ pulse to reset the counting circuit; and which also includes a manually operated switching means including a second one-shot for setting the counting circuit to a 0 count, said second one-shot having an on period greater than the first one-shot;

a flip-flop having a first input from the switching means for changing from a first to a second state and having a second input from the monostable multivibrator means for changing from the second to the first state; and connecting means for connecting an output of the flip-flop to the $n$ AND gate means to operate the $n$ AND gate means the same as the $n^{th}$ count.

* * * * *